(12) United States Patent
Huffer

(10) Patent No.: US 12,172,798 B2
(45) Date of Patent: Dec. 24, 2024

(54) PEELABLE RESEALABLE MEMBRANE FOR CONTAINERS

(71) Applicant: Sonoco Development Inc., Hartsville, SC (US)

(72) Inventor: Scott William Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 20 days.

(21) Appl. No.: 18/081,518

(22) Filed: Dec. 14, 2022

(65) Prior Publication Data

US 2023/0121740 A1 Apr. 20, 2023

Related U.S. Application Data

(62) Division of application No. 17/112,284, filed on Dec. 4, 2020, now Pat. No. 11,554,894.

(51) Int. Cl.
*B65D 17/50* (2006.01)
*B29C 48/00* (2019.01)
(Continued)

(52) U.S. Cl.
CPC ........ *B65D 17/502* (2013.01); *B29C 48/0014* (2019.02); *B29C 48/0018* (2019.02); *B29C 48/08* (2019.02); *B29C 48/10* (2019.02); *B29C 48/23* (2019.02); *B29C 63/02* (2013.01); *B29D 99/0096* (2013.01); *B32B 7/12* (2013.01); *B32B 15/088* (2013.01); *B32B 27/10* (2013.01); *B32B 27/308* (2013.01); *B32B 27/32* (2013.01); *B32B 27/34* (2013.01); *B32B 27/36* (2013.01); *B32B 37/15* (2013.01); *B65B 7/2842* (2013.01); *B65B 51/10* (2013.01); *B65D 17/02* (2013.01); *B29C 2063/485* (2013.01); *B29K 2067/003* (2013.01);
(Continued)

(58) Field of Classification Search
None
See application file for complete search history.

(56) References Cited

U.S. PATENT DOCUMENTS 3,389,827 A 6/1968 Abere et al.
3,441,197 A 4/1969 White
(Continued)

FOREIGN PATENT DOCUMENTS

EP 1066881 A2 1/2001
JP H07033158 A2 2/1995
(Continued)

OTHER PUBLICATIONS

Belmark Product—Sealutions; Sealutions peelable and resalable packaging: downloaded on Dec. 3, 2020 from https://www.belmark.com/products/sealutions-resealable-packaging/.
(Continued)

*Primary Examiner* — Robert J Grun
(74) *Attorney, Agent, or Firm* — Nelson Mullins Riley & Scarborough LLP

(57) ABSTRACT

The invention comprises a peelable membrane for resealably closing a metal end comprising an outer layer, a tacky layer, and a heat seal layer. The heat seal layer is permanently sealed to the metal end to cover at least one opening in the metal end. The tacky layer causes the peelable membrane to be resealable onto the metal end.

11 Claims, 6 Drawing Sheets

(51) Int. Cl.

| | | |
|---|---|---|
| *B29C 48/08* | (2019.01) | |
| *B29C 48/10* | (2019.01) | |
| *B29C 48/23* | (2019.01) | |
| *B29C 63/02* | (2006.01) | |
| *B29D 99/00* | (2010.01) | |
| *B32B 7/12* | (2006.01) | |
| *B32B 15/088* | (2006.01) | |
| *B32B 27/10* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 37/15* | (2006.01) | |
| *B65B 7/28* | (2006.01) | |
| *B65B 51/10* | (2006.01) | |
| *B65D 17/00* | (2006.01) | |
| *B65D 65/40* | (2006.01) | |
| *B29C 63/48* | (2006.01) | |
| *B29K 67/00* | (2006.01) | |
| *B29K 96/00* | (2006.01) | |
| *B29K 105/00* | (2006.01) | |

(52) U.S. Cl.
CPC .......................... *B29K 2096/005* (2013.01); *B29K 2105/0085* (2013.01); *B29K 2105/0097* (2013.01); *B32B 2307/31* (2013.01); *B32B 2435/02* (2013.01); *B65D 2517/0037* (2013.01); *B65D 2517/5013* (2013.01); *B65D 2517/5032* (2013.01); *B65D 2517/5083* (2013.01)

(56) References Cited

U.S. PATENT DOCUMENTS

| | | |
|---|---|---|
| 4,171,084 A | 10/1979 | Smith |
| 4,256,106 A | 3/1981 | Shoor |
| 4,537,327 A | 8/1985 | Lu |
| 5,702,019 A | 12/1997 | Grimard |
| 5,871,110 A | 2/1999 | Grimard et al. |
| 6,168,037 B1 | 1/2001 | Grimard |
| 6,857,561 B2 | 2/2005 | Williams et al. |
| 7,055,713 B2 | 6/2006 | Rea et al. |
| 7,156,252 B2 | 1/2007 | Morin |
| 7,540,383 B2 | 6/2009 | Huffer et al. |
| 9,469,445 B2 | 10/2016 | Minnette |
| 2005/0082290 A1 | 4/2005 | Fask et al. |
| 2005/0242097 A1 | 11/2005 | Morin |
| 2011/0168713 A1 | 7/2011 | Oberholzer et al. |
| 2018/0207370 A1 | 7/2018 | Rowland et al. |
| 2020/0216225 A1 | 7/2020 | Kalihari et al. |
| 2022/0177190 A1 | 6/2022 | Huffer |

FOREIGN PATENT DOCUMENTS

| | | | |
|---|---|---|---|
| WO | 2002081322 | 10/2002 | |
| WO | 2013182849 | 12/2013 | |
| WO | WO-2018035044 A1 * | 2/2018 | ......... B29C 48/0022 |

OTHER PUBLICATIONS

International Search Report and Written Opinion of the International Search Report for International Application No. PCT/US2021/059070; dated Feb. 10, 2022; 16 pages.

* cited by examiner

PEELABLE RESEALABLE MEMBRANE FOR CONTAINERS

CROSS-REFERENCE TO RELATED APPLICATIONS

This application is a divisional of U.S. application Ser. No. 17/112,284, entitled "PEELABLE RESEALABLE MEMBRANE FOR CONTAINERS," filed Dec. 4, 2020, which is incorporated herein in its entirety.

FIELD OF THE INVENTION

This invention relates generally to membranes for containers which are peelable and resealable. More particularly, the invention relates to membranes which can be affixed to metal ends of containers which are peelable and resealable.

BACKGROUND

A number of products, and particularly food products, are packaged in containers having a metal end, regardless of whether the container itself is metal. For example, a container may comprise rigid paperboard, but may have an affixed metal end which defines an opening into the container. Alternatively, a container may comprise metal or a polymeric material and may have an integral or affixed metal end which defines an opening into the container. The metal end may be integral, may be attached to the top of the container by double-seaming the metal end to a flange at the top of the container, by induction or conduction sealing, or by any other method known in the art. The metal end may comprise one or more openings which allows access to the container interior and contents.

In many cases, the opening of such metal ends is closed with a thin, flexible, peelable membrane comprised of foil, polymeric and/or paper. The membrane is sealed to the metal end (such as via a heat seal) so as to cover the opening defined in the metal end. The container is opened by peeling the membrane from the end of the container to expose the one or more openings into the container. Conventional membranes are not, however, resealable. Instead, conventional membranes are disposable. They are completely removed from the container and an overcap is provided, in some cases, to reclose the container. This solution produces unnecessary waste and is expensive to produce. Through hard work and ingenuity, the inventors have developed a peelable membrane which can be initially sealed to a metal end, can be peeled back to access the container opening, and can be then resealed onto the metal end, without the need for a reclosing overcap.

SUMMARY OF THE INVENTION

In an embodiment, the invention is directed to a container comprising: a metal end defining at least one opening into the container; a peelable membrane comprising: an outer layer; a tacky layer, wherein the tacky layer is bonded to the outer layer; and a heat seal layer, wherein the heat seal layer is bonded to the tacky layer, wherein the heat seal layer is permanently sealed to the metal end to close the at least one opening, and wherein the tacky layer allows the peelable membrane to be resealable onto the metal end.

In another embodiment, the invention is directed to a container comprising: an outer layer; a nylon layer, wherein the nylon layer is permanently bonded to the outer layer; a foil layer, wherein the foil layer is permanently bonded to the nylon layer; an additional layer, wherein the additional layer is permanently bonded to the foil layer; a tacky layer, wherein the tacky layer is bonded to the additional layer; and a heat seal layer, wherein the heat seal layer is bonded to the tacky layer; a metal end defining at least one opening, wherein the metal end is permanently bonded to the heat seal layer such that the heat seal layer covers the at least one opening, wherein the container end is peelable and resealable.

In a further embodiment, the invention comprises a method for manufacturing a container end having a peelable membrane comprising: coextruding a first layer, a tacky layer, and a heat seal layer to form a peelable membrane sheet; heating a metal end which defines at least one opening; applying the peelable membrane sheet to the heated metal end such that it covers the at least one opening; applying pressure to one of the peelable membrane sheet and the metal end to seal the peelable membrane sheet to the metal end; and scoring the peelable membrane sheet which is affixed to the metal end to form a peelable membrane lid and a tab. The method may further comprise: prior to heating the metal end, applying adhesive to one of an inner surface of an outer layer and an outer surface of a barrier layer; laminating the outer layer and the barrier layer to form a laminate; applying adhesive to one of an outer surface of the coextruded film, opposite the heat seal layer, and an inner surface of the laminate, opposite the outer layer; and laminating the laminate and the coextruded film.

BRIEF DESCRIPTION OF THE DRAWINGS

Figure 1:
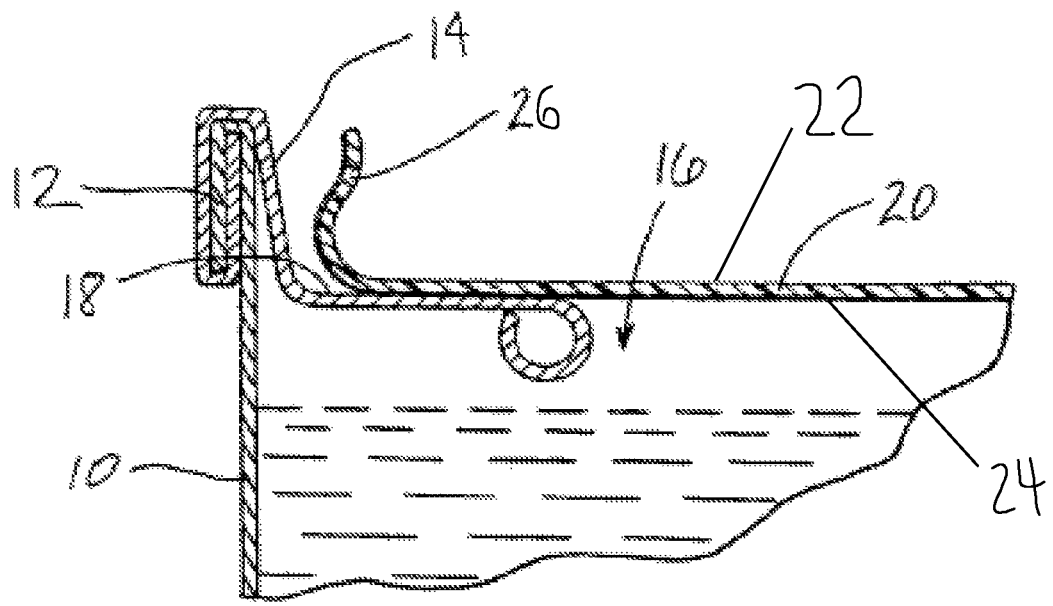
Figure 2A:
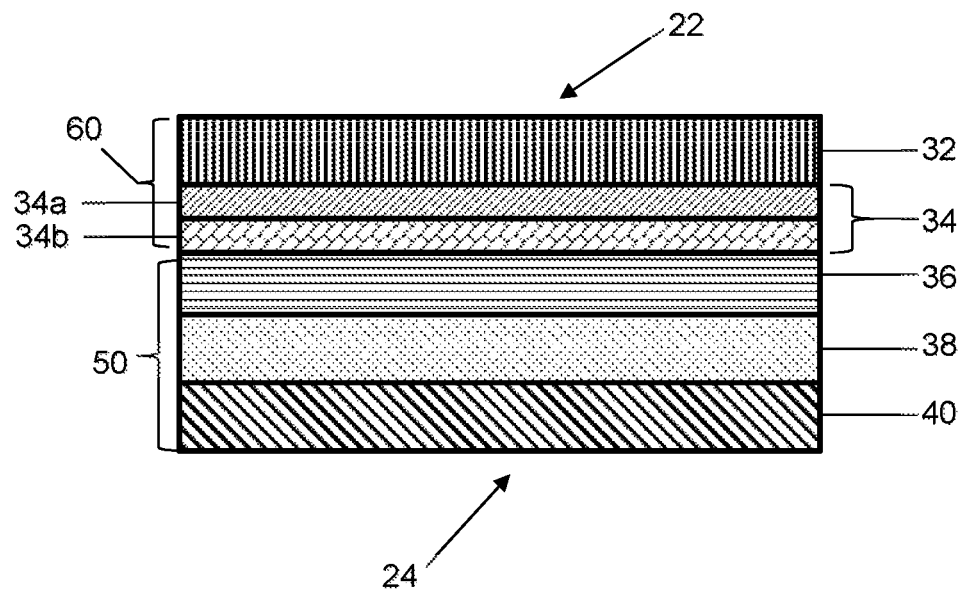
Figure 2B:
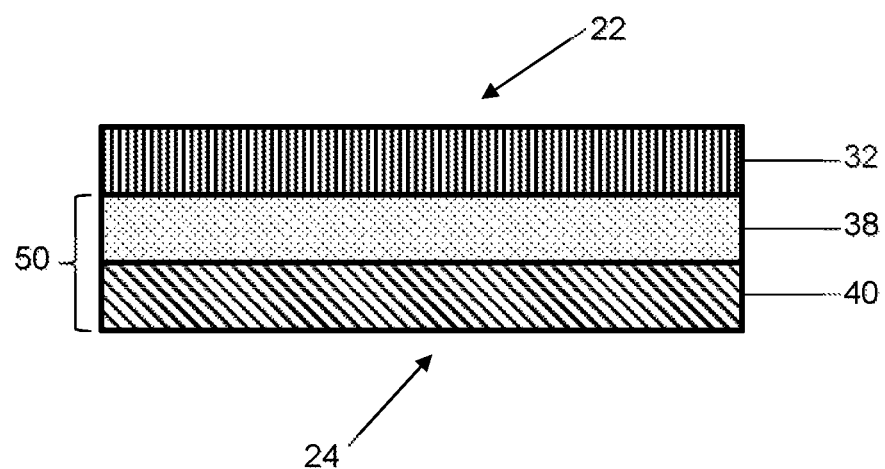
Figure 3:
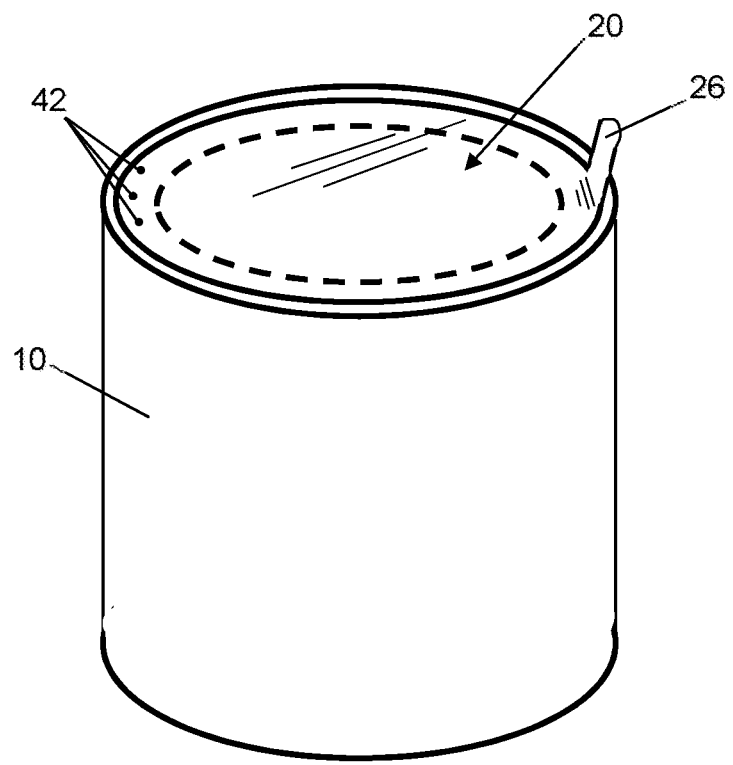
Figure 4:
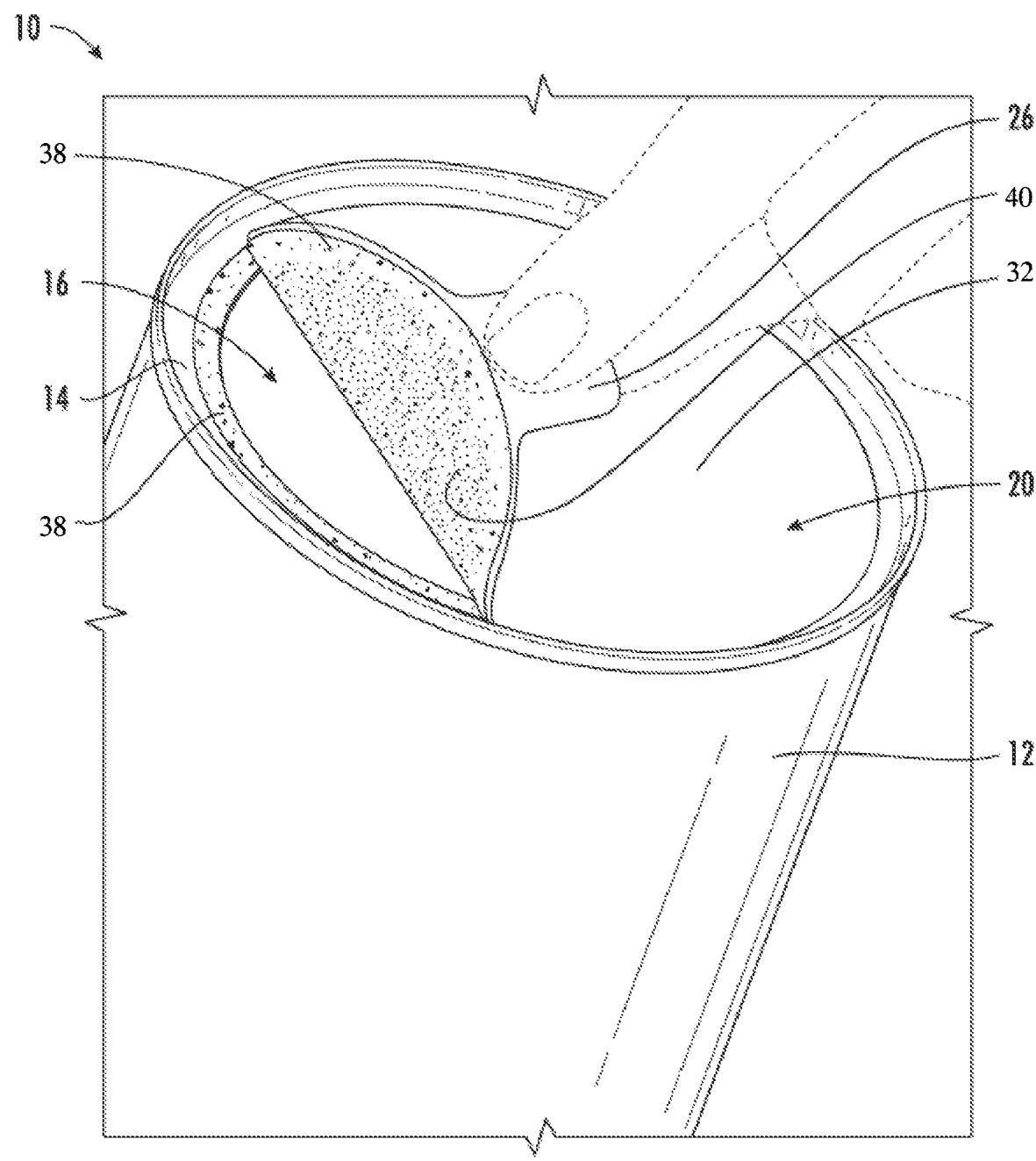

Having thus described the disclosure in general terms, reference will now be made to the accompanying drawings, which are not necessarily drawn to scale, and wherein:

FIG. 1 illustrates a cross-sectional view of the container and membrane lid in an embodiment of the present invention;

FIGS. 2A and 2B illustrate exploded cross-sectional views of the membrane lid in various embodiments of the present invention;

FIG. 3 illustrates a perspective view of the container and membrane lid in a closed embodiment of the present invention;

FIG. 4 illustrates a perspective view of the container and membrane lid in an open embodiment of the present invention; and FIGS. 5A-5D illustrate a top view of a peelable membrane sheet and a metal end in an embodiment of a method of the invention.

DETAILED DESCRIPTION OF THE INVENTION

The present invention now will be described more fully hereinafter with reference to the accompanying drawings in which some but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As shown in FIGS. 1, 3 and 4, in an embodiment, the invention comprises a container 10 to which a flexible membrane lid 20 is affixed. In an embodiment, an overcap may be applied to the container over the flexible membrane lid 20. The overcap may be used to reclose the container after an initial opening. However, due to the resealable nature of the membrane lid 20 of the invention, an overcap is not necessary in certain embodiments.

In an embodiment, the container 10 of the invention comprises metal. In another embodiment, however, the container of the invention may comprise paper, plastic or any other material or combination of materials known in the art. Likewise, the container 10 of the invention can be made by various processes. For instance, the container 10 can be formed of plastic by thermoforming, blow-molding, or injection-molding, or can be formed of composite materials (e.g., paperboard with a liner of impervious material such as polymer film and/or foil) by spiral-winding or convolute-wrapping processes.

In an embodiment, the container 10 of the invention comprises a closed bottom end and at least one upwardly extending sidewall 12. The container may be cylindrical, elliptical, ovular, square, rectangular, or any other shape known in the art. The container 10 may have multiple sidewalls, comprising a generally rectangular or square cross-section, for example. Any container shape known in the art may be utilized. In an embodiment, the bottom end, sidewall(s) and top end generally form a receptacle having an interior which may house food products, condiments, powdered beverages, pharmaceuticals, or the like.

In an embodiment, the end of the container 10 to which the metal end and flexible membrane 20 are affixed is the top end of the container. However, the metal end and flexible membrane 20 may be affixed to the bottom or a sidewall of the container 10 in certain embodiments. In an embodiment, the end of the container 10 to which the metal end is affixed may be metal, plastic, paper, or any combination thereof.

In an embodiment, the container sidewall 12 includes a flange at its top end, the flange projecting radially outwardly in an initial state (not shown) of the container prior to incorporation of a metal end 14. In an embodiment, the container comprises a metal end 14 which is the top of the container sidewall 12 or is attached to the top of the container sidewall 12, optionally by double-seaming the metal end 14 to the flange at the top of the container sidewall 12. The metal end 14 may be referred to as a metal ring. In a particular embodiment, the metal end 14 comprises tin plated steel or aluminum. As noted, the metal end 14 may be integral with the container sidewall.

In an embodiment, the metal end 14 may define an opening 16 into the container interior. The opening 16 may comprise a single opening, in an embodiment, or may comprise a plurality of openings in other embodiments. For example, the metal end 14 may comprise a shaker lid with a plurality of openings which allows dispensing of powdered or granulated materials. Alternatively, the metal end 14 may comprise a singular opening 16 for pouring out contents such as snack foods. The metal end 14 may comprise an inwardly extending (toward the central axis of the container) rim or flange 18 which defines at least one opening 16 and to which the membrane lid 20 is sealed. The flange 18 may be disposed generally horizontally and may encircle the opening 16, in some embodiments. In an embodiment, the membrane closure 20 may include a pull tab 26 that extends away from the metal end 14 (horizontally and/or vertically) and is not sealed to the metal end 14 so that it can be readily grasped and pulled to remove the membrane 20 from the metal end 14. The pull tab 26 may take any shape or configuration known in the art. For example, the pull tab 26 may be rectangular, ovular, thumb-shaped, square, or the like.

As noted, the flexible membrane lid 20 of the invention may be sealed to the metal end 14 so as to cover the at least one opening 16 defined therein. The membrane lid 20 generally includes one or more layers. Certain layers may provide strength and/or barrier properties. In an embodiment, the specific combination of layers may allow for a peelable and resealable membrane 20 that has favorable physical properties, such as, for example, strength, stiffness, and abrasion resistance. In an embodiment the layers of the membrane lid 20 may comprise materials such as metal foil, polymer films, metallized polymer films (i.e., film having a very thin coating of substantially pure metal deposited thereon), paper, or any other materials known in the art. In an embodiment, at least one layer of the membrane lid 20 comprises a barrier layer. Various materials can be used as barriers, including metal foil, metallized polyester, non-metallized polymer film (e.g., EVOH), and others. A combination of two or more such barrier layers can be used.

In an embodiment, the membrane lid 20 comprises an upper (or outer) surface 22 proximate the exterior of the container and a lower (or inner) surface 24 proximate the interior of the container. Any number of layers or composition of layers between the outer surface 22 and the inner surface 24 may be utilized herein. In an embodiment, the membrane lid 20 comprises at least the following layers, from outer surface 22 to inner surface 24: an outer layer 32, a barrier layer 34, an additional layer 36, a tacky layer 38, and a heat seal layer 40. In an embodiment, the membrane lid 20 may comprise a layered structure as shown in FIG. 2A or 2B. Additional layers may be included in some embodiments. Likewise, certain layers may be omitted, such as the barrier layer and/or the outer or additional layer (see FIG. 2B).

In an embodiment, the outer layer 32 comprises any paper or polymer known in the art. In another embodiment, the outer layer 32 comprises a polymer such as polyethylene terephthalate (PET). In certain embodiments, however, the outer layer 32 may comprise any heat-resistant polymeric material known in the art. For example, in an embodiment, the outer layer 32 comprises oriented polypropylene (OPP) or oriented polyamide (OPA). In an embodiment, the outer layer 32 comprises a biaxially-oriented clear PET film layer. In other embodiments, the outer layer 32 may be a metalized or coated PET film, or another similar layer designed to promote barrier properties against moisture and oxygen. In an embodiment, the outer layer 32 is between about 45 and 50 gauge (ga) in thickness. In an embodiment, the outer layer 32 may comprise printing, graphics, labels, nutritional information or the like. In such an embodiment, the outer layer 32 may comprise surface printing or reverse printing. In an embodiment, the outer layer 32 is the outermost layer of the peelable membrane 20.

In an embodiment, the barrier layer 34 comprises any barrier material known in the art. The barrier layer 34 may not be necessarily in certain embodiments, however. In a particular embodiment, the barrier layer 34 may comprise two layers. In this embodiment, the barrier layer 34 may comprise nylon 34*a* (adjacent the outer layer 32) and metal foil 34*b* (adjacent the nylon layer 34*a*). Any metal foil known in the art may be utilized in this embodiment. In an embodiment, the metal foil may provide tear resistance and/or barrier properties to the peelable membrane 20. In another embodiment, a two-layer barrier layer 34 may comprise metal foil and any polyamide. Use of a nylon or a polyamide in the barrier layer 34 may provide favorable physical properties, such as high strength, stiffness and/or abrasion resistance. Nylon, for example, may serve to protect the packaged product from physical abuse, stresses, and tears caused by the normal handling of the product during packaging, shipping, or during commercialization. In an embodiment, the nylon layer 34a may be between about 70 and 80 ga in thickness. In an embodiment, the foil layer 34b may be between about 0.5 and 1.5 mil in thickness. In an embodiment, the nylon layer 34a comprises cast nylon. In other embodiment, a metalized polymer may be used as the barrier layer 34.

In an embodiment the barrier layer 34 includes a primer. Any primer known in the art to assist in bonding the barrier layer 34 to adjacent layers may be utilized. In an embodiment, the primer may comprise a two-part primer system. For example, two-part urethane primer systems can be used, which employ a hydroxyl-terminated polyol and a di-functional isocyanate that when mixed together react to form a urethane having strong z-direction bonding properties to provide a secure bond at temperatures up to about 140° F. (or conditions prevailing at high altitude). The primer may serve to provide a relatively high z-direction bond strength between the barrier layer 34 and adjacent layers. The primer may help ensure that the shear or tearing strength of the bond between the barrier layer 34 and its adjacent layers is weaker than the cohesive bond strength of the tacky layer 38.

In an embodiment, an adhesive layer is disposed between the outer layer 32 and the barrier layer 34. In a particular embodiment wherein the barrier layer 34 comprises a nylon 34a and metal foil 34b, an adhesive layer may be disposed between the outer layer 32 and the nylon 34a, between the nylon 34a and the metal foil 34b, and/or adjacent the opposite size of the metal foil 34b (i.e. opposite the nylon 34a). Any adhesive layer known in the art which bonds the layers on either side of it may be utilized in this invention.

In an embodiment, the adhesive layers comprise a permanent adhesive. Any permanent adhesive known in the art, or any combination of adhesives known in the art, may be utilized in this embodiment. In some embodiments, the adhesive may be a two-component adhesive. In other embodiments, the adhesive may be a single component adhesive. The adhesive may be solvent-based or solventless. In any case, the adhesive selected should have adhesive forces which are stronger than the adhesive forces within the tacky layer 38 to ensure that the separation of the peelable membrane 20 from the metal end 14 occurs internally, within the tacky layer 38, and not between any of the following layers: polymeric layer 32, barrier layer 34, and/or the additional layer 36.

In an embodiment, the outer layer 32 and the barrier layer 34 are laminated together using techniques known in the art. In a particular embodiment, the outer layer 32, nylon 34a, and metal foil 34b are each laminated together, with the outer layer 32 serving as the outermost layer, to form a laminate 60.

In an embodiment, the peelable membrane 20 additionally comprises an additional layer 36 adjacent the barrier layer 34 (i.e. metal foil 34b). In an embodiment, the additional layer 36 may comprise any polymer or paper known in the art. In an embodiment, the additional layer 36 may comprise any polymer that is heat resistant. In this embodiment, the additional layer 36 may comprise a polyolefin. In an embodiment, the polyolefin may comprise a polyethylene. In an embodiment, the polyethylene layer 36 may include low density polyethylene (LDPE); linear low density polyethylene (LLDPE); ultra low density polyethylene (ULDPE); very low density polyethylene (VLDPE); single-site catalyzed linear low density polyethylene, including both linear and substantially linear low density resins (m-LLDPE); medium density polyethylene (MDPE); and high density polyethylene (HDPE). In another embodiment, the additional layer 36 comprises a polyolefin such as polypropylene. Any polyolefin or polyethylene known in the art may be utilized as the additional layer 36. In an embodiment, the additional layer 36 provides structural support for the peelable membrane 20 and is non-extensible. In some embodiments, the additional layer 36 may be omitted. In an embodiment, the additional layer 36 may comprise any polymer that has an affinity for foil. In an embodiment, the additional layer 36 is affixed to (i.e. laminated to) the barrier layer 34 (i.e. metal foil 34b) via a permanent adhesive layer.

In an embodiment, the tacky layer 38 comprises any adhesive or cohesive which is tacky in its cooled state. In an embodiment, the tacky layer 38 may comprise a pressure sensitive adhesive. In an embodiment, the tacky layer 38 may comprise a pressure sensitive hot melt adhesive. However, the tacky layer 38 need not be a pressure sensitive adhesive. Any adhesive that can be softened or melted for extrusion or coating purposes and returns to a generally flow-less, tacky state upon cooling may be utilized as the tacky layer 38. In an embodiment, the tacky layer 38 seals to adjacent layers or reseals to itself in its cool state, optionally via contact pressure. In an embodiment, the tacky layer 38 may comprise a thermoplastic rubber-based adhesive. In an embodiment, the tacky layer 38 may comprise ethylene vinyl acetate ("EVA"). In an embodiment, the tacky layer 38 comprises any pressure sensitive adhesive ("PSA") hot melt known in the art. In an embodiment, the tacky layer 38 comprises M-Resin.

In an embodiment, the heat seal layer 40 may comprise any composition which provides a permanent heat seal between the peelable membrane 20 and the metal end 14. The heat seal layer 40 may comprise an ethylene acid copolymer, such a methacrylic acid or acrylic acid, having acid groups partially neutralized with zinc or sodium ions. In an embodiment, the heat seal layer 40 comprises an ethylene acrylic acid copolymer or an ionomeric resin. In an embodiment, the heat seal layer 40 comprises Suryln™. The heat seal layer 40 may cover the entire inner surface of the peelable membrane 20 and may form the innermost surface of the membrane that is in contact with the contents of the container. In an embodiment, each of the layers of the peelable membrane 20 is coextensive with the others.

In an embodiment, the additional layer 36, the tacky layer 38, and the heat seal layer 40 are coextruded as a multi-layer film 50. In this embodiment, the coextruded film may be blown extruded or cast extruded. In an embodiment, a tie layer is disposed between (a) the additional layer 36 and the tacky layer 38 and (b) the tacky layer 38 and the heat seal layer 40. Any tie layer known in the art which aids in bonding the layers on either side of it may be utilized in this invention.

In an embodiment, the coextruded multi-layer film 50 is laminated to the film laminate 60 (the additional layer 36 adhered to the barrier layer 34 (i.e. metal foil 34b)), using a permanent laminating adhesive, with the heat seal layer 40 serving as the innermost layer 24. In an embodiment, the internal surface 24 of the heat seal layer 40 is non-tacky, so as to avoid the container contents from sticking to the internal surface 24 of the peelable membrane 20.

In an embodiment, the tacky layer 38 is configured to split, fracture, separate, or peel internally upon peeling back of the membrane lid 20 by a consumer. In this embodiment, a portion of the tacky layer 38 may remain adhered to the additional layer 36 and/or a portion of the tacky layer 38 may remain adhered to the heat seal layer 40. In other embodiments, the tacky layer 38 may remain adhered only to the additional layer 36 or only to the heat seal layer 40. Regardless of whether the tacky layer 38 splits internally, adjacent the polymeric layer 36 (or other layer which may be adjacent the tacky layer 38), or adjacent the heat seal layer 40, the tacky layer 38 retains its tackiness after opening, to allow it to reseal to itself, the polymeric layer 36, or the heat seal layer 40, as the case may be. The tacky layer 38 is designed such that the membrane 20 may be peeled away from the metal end 14 and resealed onto the metal end 14, optionally using applied pressure to reseal the tacky layer 38, to reclose the container.

In an embodiment, a remnant of the heat seal layer 40 and/or the tacky layer 38 remains on the metal end 14 after removal of the peelable membrane 20 by a consumer. This may provide a consumer with confidence that the membrane seal was effective prior to his or her opening of the container 10, providing a tamper evidence feature. This remnant footprint may comprise a visible ring that remains on the metal end 14. In other embodiments, the remnant footprint may comprise a discontinuous visible ring.

In an embodiment, the bond strength between the heat seal layer 40 and the metal end 14 is greater than the cohesive strength of the tacky layer 38, thereby preventing the separation of the heat seal layer 40 from the metal end 14 upon opening of the container via the peelable membrane 20.

By designing the peelability mechanism (i.e. the tacky layer 38) into the peelable membrane itself (i.e. in contrast to the peeling occurring between the sealant and the metal end), the present invention does not depend on the seal strength of the membrane lid to the metal end to determine total seal strength, as the membrane is not designed to separate cleanly from the metal end. Rather, because the membrane 20 of the invention fractures internally, it can be utilized in combination with any container end known in the art. The seal strength of the membrane 20 defines the seal strength of the closure, regardless of the particular container end utilized.

In an embodiment, the functionality of the peelable membrane 20 may be activated by applying an initial opening force on the peelable membrane 20 in a direction generally perpendicular to the top surface of the peelable membrane 20. The initial opening force may be greater than a threshold force at which separation of the tacky layer 38 occurs. The initial opening force may be sufficient to cause (a) the tacky layer 38 to fail internally, (b) a failure in the interface between the tacky layer 38 and the additional layer 36, or (c) a failure in the interface between the tacky layer 38 and the heat seal layer 40.

To reclose the container, the peelable membrane 20 may be returned into contact with metal end 14 and an optional reclose pressure may be applied to the peelable membrane 20. The reclose pressure may be applied to the peelable membrane 20 in a direction generally perpendicular to the peelable membrane 20 bottom surface. The reclose pressure may be sufficient to cause (a) the tacky layer 38 to re-adhere cohesively, (b) the tacky layer 38 to re-adhere to the additional layer 36, and/or (c) the tacky layer 38 to re-adhere to the heat seal layer 40, as the case may be. Re-adherence may reseal the peelable membrane 20 to the metal end 14. The opening and re-adherence processes may be repeated as desired.

The closure system of the invention can be employed with various types of metal ends, including bare (i.e., uncoated) metal as well as coated metal. As examples, the invention is applicable to spot-coated electro-tin-plated (ETP) steel as well as uncoated ETP steel. The invention is advantageous in that the blow-off strength and peel-force characteristics of the seal between the membrane lid 20 and the metal end 14 are not affected to a substantial extent by the surface characteristics of the metal end (i.e., whether it is uncoated or coated, etc.) because the failure mechanism of the seal occurs within the tacky layer 38.

In an embodiment, the membrane lid 20 has a holding force to the end of the can which is sufficient to reliably maintain vacuum and/or seal during handling conditions, including packaging, shipping and long storage of the cans, while concurrently being removable with a peel force acceptable to a consumer of average strength.

In an embodiment, the membrane lid 20 is retained on at least one end or edge of the metal end 14. That is, the membrane lid 20 may have a stopping point along one of its edges such that the lid 20 cannot be fully removed from the metal end 14 and is retained thereon for reclosure purposes. In an embodiment, the stopping point of the membrane lid 20 is opposite the pull tab 26.

Method of Manufacture

In an embodiment, the method for manufacturing the container of the invention comprises, first, formation of a peelable membrane as described herein. In an embodiment, the additional layer 36, the tacky layer 38, and the heat seal layer 40 are coextruded as a multi-layer film 50. The coextrusion may comprise blown film extrusion, cast film extrusion, or any other method known in the art. Tie layers may be included between the various layers to aid in bonding of the layers.

In an embodiment, the outer layer 32 and the barrier layer 34 (i.e. nylon 34a, and metal foil 34b) are laminated together to form a laminate 60. In this embodiment, a permanent adhesive may be applied to the inner surface of the outer layer 32 and/or the outer surface of the barrier layer 34 (or the outer surface of the nylon 34a as the case may be). The inner surface of the outer layer 32 may then be adhesively joined to the outer surface of the barrier layer 34. Similarly, if the barrier is a two-layer component, an adhesive may be applied to the inner surface of the nylon 34a, for example, opposite the outer layer 32, or the outer surface of the foil 34b, and the inner surface of the nylon 34a and the outer surface of the foil 34b may then be adhesively joined to form a film laminate 60. Lamination may be accomplished using a laminating machine comprising two rollers forming a nip therebetween, or may be accomplished using any other method known in the art.

Further, an adhesive may be applied to the innermost surface of the laminate 60, such as the inner surface of the foil 34b, or to the outer surface of the coextruded film 50 (i.e. the outer surface of the additional layer 36), and the laminate 60 and the coextruded film 50 may be adhesively joined to form a peelable membrane sheet 70 (see FIG. 5).

Figure 5A:
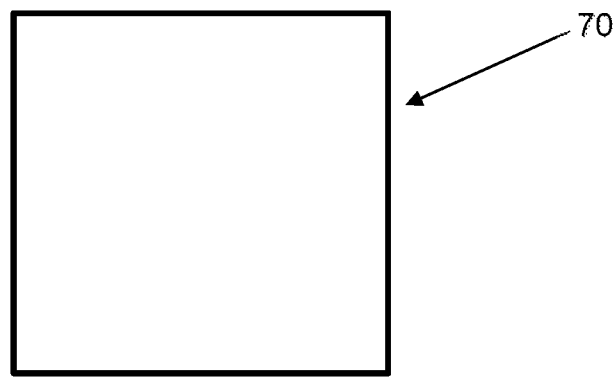
Figure 5B:
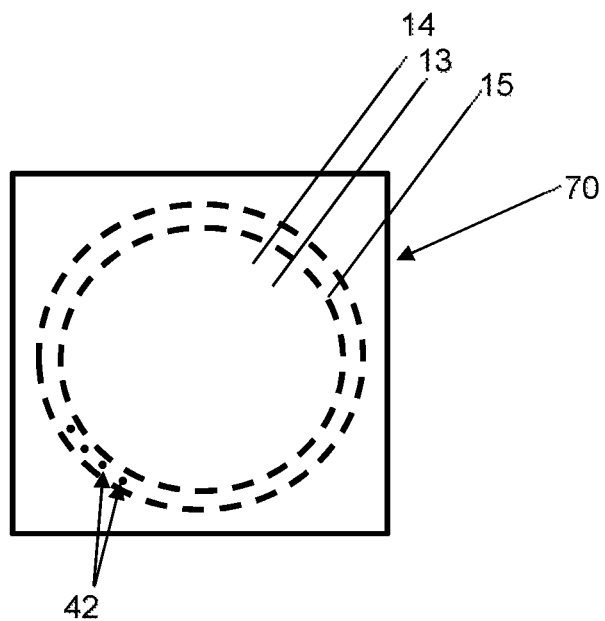
Figure 5C:
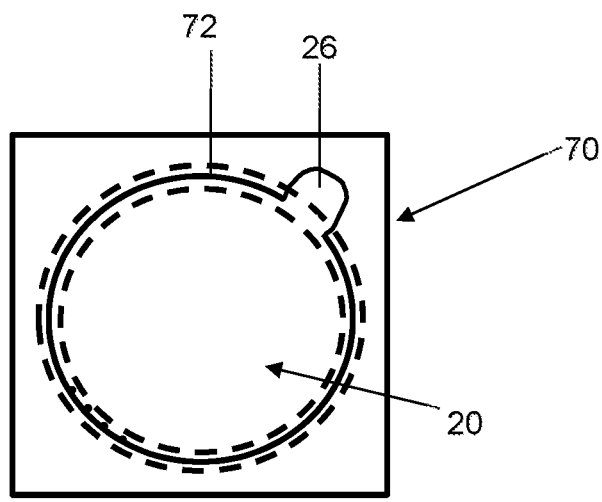

In an embodiment, the peelable membrane sheet 70 may then be sealed to one or more metal ends 14. FIG. 5A-5B illustrate this process. In this embodiment, the peelable membrane sheet 70 may be sealed to preformed metal ends 14 prior to cutting or scoring of the peelable membrane sheet 70 to form the peelable membrane 20 and tab 26. In this embodiment, the peelable membrane sheet 70 may be overlaid on one or more metal ends 14 (shown in dashed lines in FIG. 5B as being underneath the peelable membrane sheet 70; interior rim 13 and exterior rim 15) and sealed to the metal end 14. In an embodiment, the metal end 14 comprises a flange or ring to which the peelable membrane sheet 70 is sealed. The sealing process may comprise first conduction or induction heating the metal end 14 and then applying the peelable membrane sheet 70 to the heated end 14 under pressure. In an embodiment, the sealing may occur at a temperature range of between about 250° F. to about 500° F. for 1 second using pressure of about 40 PSI.

In an embodiment, additional heat and/or pressure may be applied to at least one region of the peelable membrane sheet 70 when it is positioned on the metal end 14. This additional heat and/or pressure may create one or more permanent welds 42 between the peelable membrane sheet 70 and the metal end 14, such that the peelable membrane 20 cannot be removed from the metal end 14 in such region. This provides a stopping point for removal of the membrane lid 20, such that it remains on the metal end 14 in the welded region 42 so that the peelable membrane may be easily aligned and reclosed onto the metal end after consumption or use of part of the container contents. In another embodiment, mechanical means may be utilized to retain the membrane lid on the metal end, such as a particular texture or indentation which creates a stopping point. Additionally or alternatively, the metal end 14 may comprise a surface pattern or elevation which aids in locking the membrane onto the metal end. In an embodiment, the position of the permanent weld 42 is opposite a position of a peel tab 26.

Figure 5D:
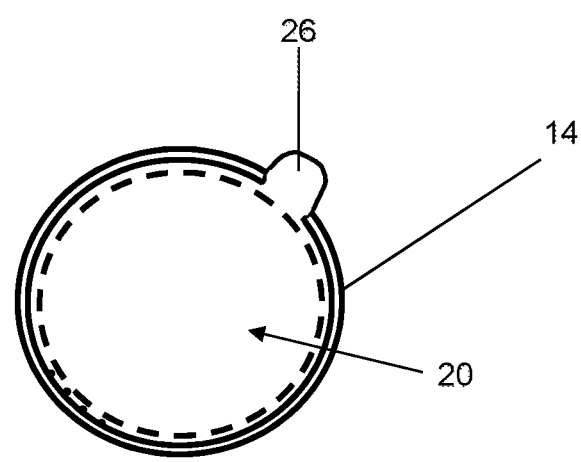

In an embodiment, the peelable membrane sheet 70 with the affixed metal end 14 is then fed to a scoring station where the peelable membrane sheet 70 may be scored (see score line 72 in FIG. 5C) and trimmed to form (a) pull tabs 26 and (b) discrete peelable membrane lids 20 which are trimmed to size for the metal end 14. Any excess or skeleton from the peelable membrane sheet 70 may be discarded, resulting in a peelable membrane lid 20 and an affixed metal end 14, as shown in FIG. 5D. The pull tab 26 may be folded upwardly, back onto the peelable membrane 20, or in any other configuration, in an embodiment.

In an embodiment, the peelable membrane lids 20 may be generally circular, with the exception of the pull tab 26. The lids may be cut or scored with a laser, a die cutting machine or by any other suitable means known in the art.

As discussed herein, the peelable membrane structure is laminated into a sheet form, such that the layers are each coextensive. That is, the tacky layer 38 and the heat seal layer 40 are coextensive with the entire peelable membrane sheet 70. In an embodiment, no registration of the tacky layer 38 or heat seal layer 40 is needed during the scoring, cutting, or trimming process.

In other embodiments, tacky layer 38 and/or heat seal layer 40 may be pattern applied to just the portion of the peelable membrane 20 which will contact the metal end 14, in which case registration may be necessary.

Many other modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for manufacturing a metal container end having a peelable membrane comprising:
   coextruding a first layer, a tacky layer, and a heat seal layer to form a peelable membrane sheet to form a coextruded film;
   applying adhesive to one of an inner surface of an outer layer and an outer surface of a barrier layer;
   laminating the outer layer and the barrier layer to form a laminate;
   applying an adhesive to one of an outer surface of the coextruded film, opposite the heat seal layer, and an inner surface of the laminate opposite the outer layer;
   laminating the laminate and the coextruded film to form the peelable membrane sheet;
   heating a metal end which defines at least one opening;
   applying the peelable membrane sheet to the heated metal end such that it covers the at least one opening;
   applying pressure to one of the peelable membrane sheet and the metal end to seal the peelable membrane sheet to the metal end; and
   scoring the peelable membrane sheet which is affixed to the metal end to form a metal container end having a peelable membrane lid and a tab.

2. The method of claim 1 wherein the outer layer comprises polyethylene terephthalate, wherein the tacky layer comprises a hot melt pressure sensitive adhesive, wherein the heat seal layer comprises an ethylene acrylic acid copolymer or an ionomeric resin, and wherein the barrier layer comprises a layer of nylon and a layer of metal foil, wherein the nylon layer is adjacent the outer layer.

3. The method of claim 1 additionally comprising an additional layer, wherein the additional layer comprises a polymer or a paper, and wherein the additional layer is permanently bonded to the barrier layer, and disposed between the barrier layer and the tacky layer.

4. The method of claim 3 wherein a cohesive bond strength of the tacky layer is less than a bond strength between (a) the heat seal layer and the metal end, (b) the first layer and the barrier layer, and (c) the barrier layer and the additional layer.

5. The method of claim 1 wherein the metal end comprises a flange and the peelable membrane sheet is sealed to the flange.

6. The method of claim 1 further comprising attaching the metal end to a container.

7. The method of claim 1 wherein the coextrusion comprises blown coextrusion.

8. The method of claim 1 wherein the first layer comprises a polymer or a paper.

9. The method of claim 1 wherein the first layer comprises polyethylene terephthalate.

10. The method of claim 1 wherein the tacky layer comprises a hot melt pressure sensitive adhesive.

11. The method of claim 1 wherein the tacky layer separates (a) internally, (b) from the heat seal layer, or (c) from the layer adjacent the tacky layer and opposite the heat seal layer, upon peeling of the peelable membrane.

* * * * *